United States Patent [19]

Brun et al.

[11] Patent Number: 4,944,956
[45] Date of Patent: Jul. 31, 1990

[54] NEW ETHANOLIC COMPOSITIONS CONTAINING ANETHOLE

[75] Inventors: Bernard Brun, Montpellier; Pierre Dupont, Sucy-en-Brie, both of France

[73] Assignee: Pernod Ricard, Paris, France

[21] Appl. No.: 429,565

[22] Filed: Oct. 31, 1989

[30] Foreign Application Priority Data

Nov. 7, 1988 [FR] France .................................. 88 14501

[51] Int. Cl.$^5$ .............................................. C12G 3/06
[52] U.S. Cl. ...................................... 426/592; 426/538
[58] Field of Search ................................. 426/592, 538

[56] References Cited

U.S. PATENT DOCUMENTS 3,988,512 10/1976 Johnson .............................. 426/590
4,371,559 2/1983 Voisin ................................. 426/592
4,411,813 10/1983 Voisin ................................. 426/590

FOREIGN PATENT DOCUMENTS 872145 5/1942 France .
2165029 8/1973 France .
2546880 12/1984 France .

*Primary Examiner*—Carolyn Paden
*Attorney, Agent, or Firm*—Dressler, Goldsmith, Shore, Sutker & Milnamow, Ltd.

[57] ABSTRACT

The present invention relates to a clear ethanolic composition containing anethole, which is constituted of at least one water-ethanol medium containing from 10 to 30% v/v of ethanol, and 1 to 3 g/l of anethole and, in addition, of a quantity, which is effective to keep the composition clear, of a surfactant or of a mixture of surfactants having the following characteristics:

it is acceptable in human foodstuffs,
its HLB is $12 < HLB < 15$,
the CMC is $10^{-1} > CMC > 10^{-3}$, the haze point being greater than 30° C. for a non-ionic surfactant and the Krafft temperature being less than 10° C. for an ionic surfactant.

11 Claims, No Drawings

NEW ETHANOLIC COMPOSITIONS CONTAINING ANETHOLE

BACKGROUND OF THE INVENTION

The present invention relates to clear water-ethanol compositions intended to be diluted causing a haze, more particularly the invention relates to pastis of low alcoholic degree.

SUMMARY OF THE INVENTION

Pastis are aperitive drinks constituted by a clear solution of anethole in ethanol. The most common pastis correspond to 2 g/l solutions of anethole in 45% v/v ethanol.

Consumers wish to have drinks of this anethole-based type available in which the alcohol content would be less than 45%, for example drinks containing only 20% of alcohol.

For reasons connected with the organoleptic qualities of the drink, it is not possible to reduce the concentration of anethole too much; it should remain at about 2 g/l. Under these conditions it is not possible to dissolve 2 g/l of anethole in 20% alcohol: a haze, which is not commercially acceptable for this type of product, is produced immediately. In addition, account must be taken of the fact that anise-containing drinks, while they must be clear in the bottle, should form a haze by the addition of water, that is to say by dilution with about 5 volumes of water.

The subject of the present invention is a clear ethanolic composition containing anethole or a compound of the same type, which is constituted of at least one water-ethanol medium containing from 10 to 30% v/v of ethanol and 1 to 3 g/l of anethole and, in addition, of a quantity, which is effective to keep the composition clear, of a surfactant or of a mixture of surfactants having the following characteristics:
  it is acceptable in human foodstuffs,
  its HLB is $12 < HLB < 15$,
  the CMC is $10-1 > CMC > 10-3$,
the haze point being greater than 30° C. for a non-ionic surfactant and the Krafft temperature being less than 10° C. for an ionic surfactant.

These compositions allow anethole-based drinks to be obtained having alcoholic degrees which can vary from 10 to 30% v/v which remain clear when they are in bottles and form hazes when quantities of water ranging from 1 to 10 volumes of water are added.

The compositions according to the invention can, of course, contain other components, in particular sugar.

DESCRIPTION OF THE PREFERRED EMBODIMENTS

The notion of HLB is well known in the surfactant field; it is the hydrophilic-lipophilic balance.

In the compositions according to the invention, in particular for alcohol contents of the order of 20% and anethole concentrations of the order of 2 g/l, surfactants having an HLB of between 13 and 14, preferably of the order of 13.5, will preferably be used.

The CMC or critical micellar concentration corresponds to the concentration above which the surfactants have the property of associating in micelles. In the compositions according to the present invention, surfactants having CMCs of between $5 \times 10-3$ and $5 \times 10-2$ will preferably be used.

The solubility properties of surfactants are measured according to the nature of the surfactant, either by its Krafft temperature for ionic surfactants, or by its haze point for non-ionic surfactants.

In the compositions of the invention, it will be preferred to use ionic surfactants having Krafft temperatures less than 10° C., preferably less than 0° C., and nonionic surfactants having haze points greater than 30° C., preferably greater than 50° C.

The surfactants used can belong to any one of the surfactant families anionic, cationic, amphoteric or non-ionic.

Among the preferred surfactants there must be mentioned the ethylene polyoxide-based surfactants, in particular those of general formula $R-O-(CH_2-CH_2-O)_nH$ where R can be an alkyl radical, in particular a $C_7$ to $C_{10}$ alkyl radical, or an aryl radical substituted, preferably in the para-position, by alkyl radicals, n varying from 5 to 15.

The product, sold under the commercial designation C8E5 by the Nikkon company, in which n=5 and in which R is a saturated alkyl radical of formula $C_8H_{17}$ has allowed easy dissolution of 2 g/l of anethole in a water-alcoholic solution containing 20% of ethyl alcohol to be obtained. This solution forms a haze by addition of water.

Sucroesters, which are emulsifying agents authorized for human foodstuffs by the EEC under the additive number E 473, may also be used. Sucroesters are essentially composed of sucrose mono- and diesters of the fatty acids of food oils and fats. Generally, these fatty acids contain 16 or 18 carbon atoms, which leads to products of too low an HLB. However, if mono- or polyesters of a sugar are used with medium-chain fatty acids having 4 to 12 carbon atoms, a sucroester having the physicochemical characteristics necessary to the application of the invention can be prepared.

Among these sucroesters there must be mentioned the sucrose esters, in particular with caproic, caprylic, capric and lauric acids.

The following examples have no limiting character and allow those versed in the art better to understand the implementation of the invention and its significance.

EXAMPLE 1

A clear solution is made up containing 2 g/l of anethole in a 20% v/v water-ethanol solution; the surfactant is lithium acetylbenzenesulfonate:

$T_K < 0°$ C. $M = 276$ $CMC = 16 \times 10^{-3}$ mole.kg$^{-1}$ used at 7.1 g/l.

This solution is clear at 20° C.

It forms a haze by dilution if 4 volumes of water are added.

EXAMPLE 2

A clear solution is made up containing 2 g/l of anethole in a 20% v/v water-alcoholic solution; the non-ionic surfactant is C8E5 used at 9.5 g/l:

$HLB = 13.24$ $M = 350.5$ $CMC = 9.2 \times 10^3$ mole.l$^{-1}$ haze point $> 50°$ C.

EXAMPLE 3

A clear solution is made up containing 2 g/l of anethole in a 25% v/v water-alcoholic solution; the non-ionic surfactant is sucrose monocaprate sold by the SIGMA sucrose company under the number S 1266, and used at the rate of 25 g/l $HLB = 13.75 \quad M = 496$ CMC and haze point are not determined.

This clear solution forms a haze by dilution with 4 volumes water.

We claim:

1. A clear ethanolic composition containing anethole, which comprises of at least one waterethanol medium containing from 10 to 30% v/v of ethanol and 1 to 3 g/l of anethole and, in addition, of a quantity, which is effective to keep the composition clear, of a surfactant or of a mixture of surfactants having the following characteristics:
   it is acceptable in human foodstuffs,
   its HLB is $12 < HLB < 15$,
   the CMC is $10^{-1} > CMC > 10^{-3}$,
the haze point being greater than 30° C. for a non-ionic surfactant and the Krafft temperature being less than 10° C. for an ionic surfactant.

2. The composition as claimed in claim 1, wherein the HLB is $13 < HLB < 14$.

3. The composition as claimed in one of claims 1 or 2, wherein the Krafft temperature of the surfactant is less than 0° C.

4. The composition as claimed in one of claims 1 or 2, wherein the haze point of the surfactant is greater than 50° C.

5. The composition as claimed in one of claims 1 or 2, wherein the CMC is $5 \times 10^{-3} < CMC < 5 \times 10^{-2}$.

6. The composition as claimed in claim 1, wherein the surfactant is a compound of the general formula $$R-O-(CH_2-CH_2-O)_nH$$

where R is selected from the group consisting of alkyl radicals and aryl radicals having alkyl radical substituents, n varying from 5 to 15.

7. The composition as claimed in claim 1, wherein the surfactant is a mono- or polyester of a sugar and of fatty acids containing from 4 to 12 carbon atoms.

8. The composition as claimed in claim 7, wherein the sugar is chosen from the sucrose mono- and diesters.

9. The composition as claimed in one of claims 7 and 8, wherein the surfactant is chosen from the esters of caproic, caprylic, capric and lauric acids.

10. The composition as claimed in one of claims 1 or 6 which is a solution of anethole at about 2 g/l in a 20% v/v water-ethanol solution.

11. The composition as claimed in claim 6 wherein said alkyl radicals are $C_7$ to $C_{10}$ alkyl radicals and said aryl radicals have alkyl radical substituents in the para-position.

* * * * *

UNITED STATES PATENT AND TRADEMARK OFFICE
CERTIFICATE OF CORRECTION

PATENT NO. : 4,944,956

DATED : July 31, 1990

INVENTOR(S) : Bernard Brun and Pierre DuPont

It is certified that error appears in the above-identified patent and that said Letters Patent is hereby corrected as shown below:

Col. 1, line 11, delete the title "SUMMARY OF THE INVENTION".

Col. 1, after line 31, insert the title --SUMMARY OF THE INVENTION--.

Col. 1, after line 42, change "10-3" to --$10^{-3}$-- (i.e., "-3" should be superscript).

Col. 1, line 67, change "10-3and" to --$10^{-3}$ and-- (i.e., "-3" should be superscript).

Col. 1, line 68, change "10-2will" to --$10^{-2}$ will-- (i.e., "-2" should be superscript).

Col. 2, line 51, delete the line and substitute --$T_K$<0 C.   M = 276-- (inserting several spaces between "C." and "M").

Col. 2, line 52, delete "=" (the equal sign) after CMC and substitute --≈-- (the sign indicating "approximately equal to").

Col. 2, line 64, delete the line and substitute --HLB = 13.24   M = 350.5-- (inserting spaces between "13.24" and "M").

UNITED STATES PATENT AND TRADEMARK OFFICE
CERTIFICATE OF CORRECTION

PATENT NO. : 4,944,956

DATED : July 31, 1990

INVENTOR(S) : Bernard Brun and Pierre DuPont

It is certified that error appears in the above-identified patent and that said Letters Patent is hereby corrected as shown below:

Col. 3, line 26, delete "$10^{311}$" and substitute --$10^{-1}$--.

Col. 4, line 8, delete "$10^{31\ 3}$" and substitute --$10^{-3}$--.

Signed and Sealed this

Twenty-eighth Day of January, 1992

Attest:

HARRY F. MANBECK, JR.

*Attesting Officer*  *Commissioner of Patents and Trademarks*